Jan. 6, 1959 — R. H. MONEY — 2,867,165
PORTABLE BARBECUE COOKER
Filed June 22, 1956 — 2 Sheets-Sheet 1

Reynard H. Money
INVENTOR.

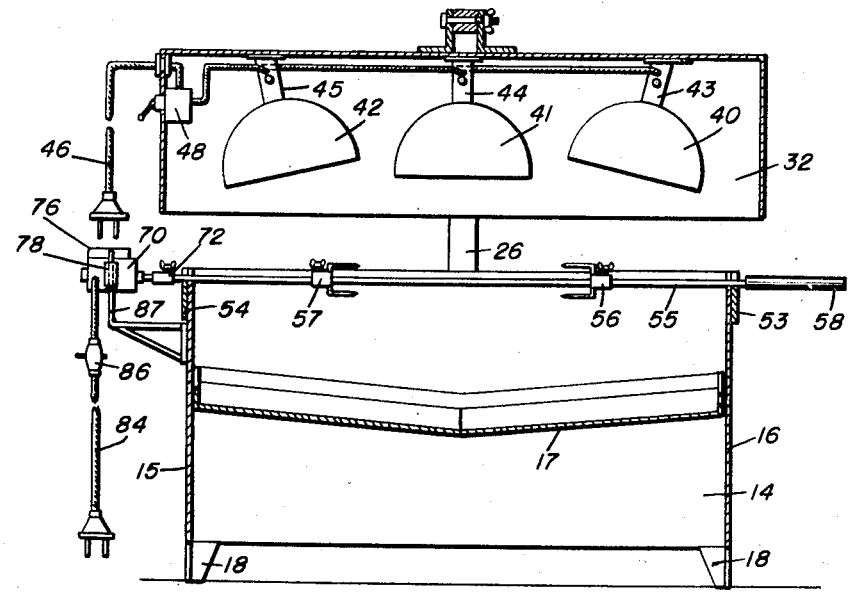

United States Patent Office 2,867,165
Patented Jan. 6, 1959

2,867,165
PORTABLE BARBECUE COOKER
Reynard H. Money, El Paso, Tex.
Application June 22, 1956, Serial No. 593,237
1 Claim. (Cl. 99—423)

This invention relates to cookers and particularly to cookers of the type where the food article is adapted to be moved during the cooking operation.

The oven which is made in accordance with the invention is intended primarily as a barbecue cooker for frying chickens, small picnic hams, rabbits, etc. to be used in a small family home or picnic area. However, by enlarging the cooker and its capacity it could be used to meet almost every cooking need regardless of the demands thereon. One of the principal objects of the invention is to provide a practical and smoothly operative barbecue cooker that has a minimum of moving parts, there being no chains, sprockets, wheels, gears, pulleys and other mechanically movable parts which require servicing and which are noisy in operation. In achieving the results of simplicity in design, such considerations as numerous adjustments, especially those which would be subjected to the heat in the cooking operations have been omitted and avoided.

A further object of the present invention is to provide a cooker wherein there is a motor providing the source of power for operating a food article supporting device, for example a spit or a pie tray, this motor having a coupling on the shaft for direct connection to the spit or the pie plate support and being locatable in selected brackets that are mounted on the oven in order to alter not only the position of the motor but also the axis of rotation of its shaft.

A further object of the invention is to provide a cooker as described above wherein there is provision for accommodating food articles for broiling that is, without the use of the motor, whereby the versatility of the cooker is enhanced.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a side view similar to Figure 2 but showing the cooker arranged for another use;

Figure 4 is a sectional view taken on the line 4—4 of Figure 2;

Figure 5 is a sectional view taken on the line 5—5 of Figure 1;

Figure 8 is a plan view of a screen that is adapted to be rested over the open top of the oven in order to accommodate stationary food articles for cooking thereon.

Figure 1:
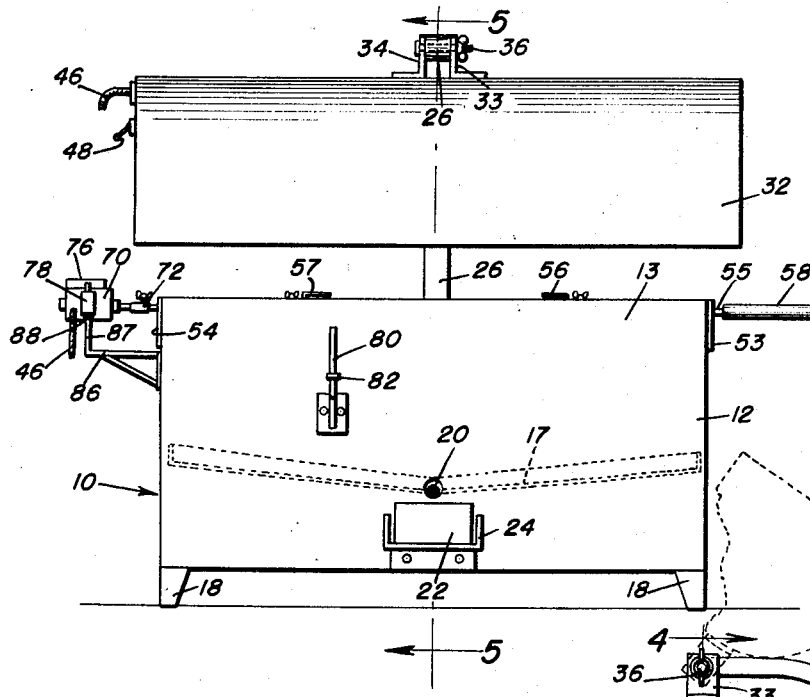
Figure 1 is an elevational front view of a cooker which is made in accordance with the principles of the invention.
Figure 6:
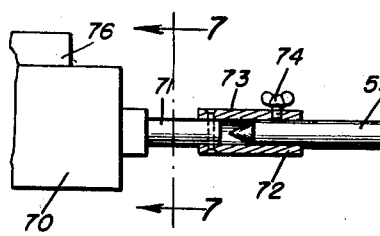
Figure 6 is a fragmentary elevational view with parts in section showing the coupling between the motor and either the spit or the pie tray support.

In practicing the invention there is a cooker 10 shown in the drawings exemplifying one of the embodiments of the invention. The cooker has an oven 12, the latter being made of four side walls 13, 14, 15 and 16, together with a bottom 17. The oven has an open top and a number of legs 18 which support the oven. These legs may be supplied with openings so that they may be bolted down on a bench or onto any other supporting surface. Bottom 17 constitutes a drip pan or tray and is located between the top and bottom edges of the side walls. It slopes from the back wall 14 to the front wall 13 of the oven and it slopes from the two side walls 15 and 16 toward the transverse center thereof. Spout 20 passes through a hole in the front wall 13 and is in registry with the lowest one of the bottom 17 in order to discharge liquids from the interior of the oven into the receptacle 22. This receptacle is removably supported on bracket 24 which is secured to the oven front wall. Although it may assume various configurations a suggested one of bracket 24 is an upwardly opening channel facilitating the placement and removal of the receptacle 22.

Figure 2:
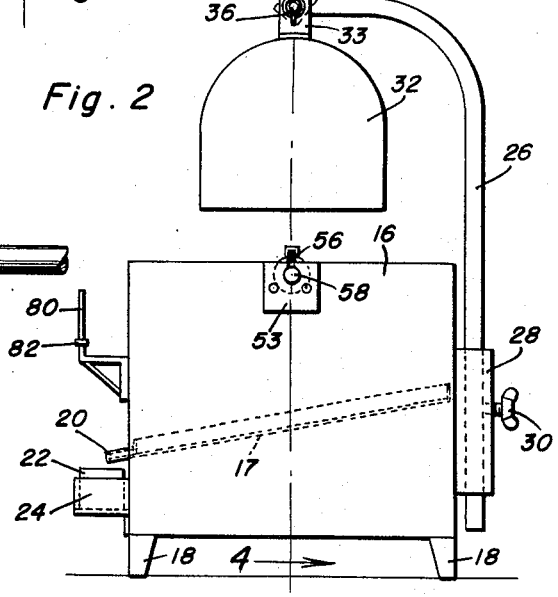
Figure 2 is a side view of the cooker in Figure 1.
Figure 7:
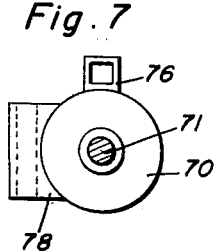
Figure 7 is a transverse sectional view taken on the line 7—7 of Figure 6.

Support rod 26 is adjustably secured to the back wall 14 of the oven. Socket 28 is fixed to the outer surface of the back wall 14 and has a set screw 30 whose inner end is adapted to bear on the surface of support rod 26. Accordingly, the support rod is vertically adjustable in the socket 28 in order to selectively position bonnet 32 with respect to the open top of the oven. This bonnet is an elongated enclosure having a curved longitudinal wall together with end panels. A pair of ears 33 and 34 are fixed to the center of the bonnet and they accommodate a pivot bolt 36, the latter passing through aligned openings in the ears and an opening in the outer extremity of support rod 26. The outer end of the support rod is angulated (Figure 2) in order to position the bonnet 32 over approximately the center of the open top of the oven. Therefore by adjusting the rod 26 upwardly or downwardly the spacing between the bonnet 32 and the open top of the oven may be altered. In addition the bonnet may be swung about an axis coincident with the longitudinal axis of the bolt 36 and then held in place by tightening the nut on the bolt. Such angular adjustments are shown in Figures 2 and 3.

The heater is disposed in bonnet 32. It is preferred that this heater be made of a number of infra-red heating lamps, for example lamps 40, 41 and 42 that are carried by their sockets 43, 44 and 45 respectively. These sockets are secured to the inside of bonnet 32 with the two outside sockets 43 and 45 being arranged at an angle slightly converging toward the light ray axis of lamp 41. This concentrates the light and heat on a smaller area of the open top of oven 12. An electric wire 46 has a plug on it which is adapted to be connected to a source of electrical energy, this wire extending to switch 48 which is of the type that has several positions in order to operate selectively one or more of the lamps. The wiring for the sockets extends properly from the terminals of the switch 48 to the sockets in order that they may function in this way.

A pair of upwardly opening recesses are formed in the side walls 15 and 16. Wooden bearings 53 and 54 having similar recesses are attached to the side walls 15 and 16 to form cradles that accommodate spit 55. This spit is one of the support devices for food articles that are usable with the oven. It is made of an elongated shank or shaft that has a pair of adjustable clamps 56 and 57 together with a handle 58, the latter being adapted to be exposed on the exterior of the oven while the shaft extends transversely thereacross and is removably seated in the bearings 53 and 54.

Another food article supporting device is seen best in Figure 3 and comprises a tray 60 that has a shaft 61 secured to the bottom surface thereof. This tray is used for supporting any type of food article but particularly breads, pies and cakes. When the spit is used (Figure 5), the bonnet 32 is directed as shown in Figure 5 in order to have the heat rays on the meat carried by the spit. When the tray 60 is used, the bonnet is appropriately adjusted as shown in Figure 3. Another food article supporting device is seen in Figure 8 and it comprises a screen 63 having a frame 64 that is adapted to seat on the upper edges of the side walls of the oven with downwardly opening supporting clips 66 overlying the upper edges of the side walls and preventing the screen from slipping. This screen is adapted to support stationary articles of food during their cooking operations.

There are selectively operable means for actuating the shafts of the spit or of the tray. These selectively operable means consist of a motor 70 whose speed is very slow, this being achieved by standard means, as a speed reducer built into the motor casing. Motor 70 has a shaft 71 which protrudes therefrom and which has a coupling 72 secured thereto. This coupling comprises a sleeve 73 having a set screw 74 carried by it. The sleeve is pinned or otherwise fixed to the shaft 71 and has an open end in which to accommodate the shaft of the spit or the shaft 61. The casing of the motor 70 has two sockets 76 and 78 fixed to it. Socket 76 is parallel to the axis of shaft 71, while socket 78 is at right angles to it. It is preferred that these sockets have non-circular bores, for example square, in them. A motor mounting bracket 80 is secured to the front wall 13 of the oven. It is of a cross-sectional shape similar to the cross-sectional shape of the bore in sockets 76 and 78 so that when the motor is attached to the mounting bracket 80, there will be no rotation of the motor with respect to the bracket. Stop 82 is fixed to a vertical part of the generally L-shaped bracket and forms a seat on which the socket 76 rests when the motor is applied thereto (Figure 3). An electric cord 84 extends from the motor and has a plug in order to attach with a standard source of electrical energy. The cord has a switch 86 in it in order to control the energization of motor 70. When in bracket 80 shaft 61 is attached to the motor for rotation, thereby rotating the tray 60.

When it is desired to rotate spit 55, the motor is lifted from bracket 80 and placed on bracket 86 which is fastened to the side 15 of the oven. This bracket has a vertical part 87 that is non-circular in cross-section, and a stop 88 thereon. This bracket is fitted in socket 78 in order to hold the motor in the approximately horizontal position (Figure 1). Accordingly, the generally horizontally disposed spit 55 may be coupled thereto for actuation by the motor.

In use of the cooker it is interchangeable from a spit operating barbecue cooker to a stationary broiler by the substitution of screen 63 for spit 55. When it is desired to use the cooker for food articles that more conveniently fit in tray 60, the motor is interchanged by separating it from one bracket and placing it on the other bracket in the manner previously described.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

In combination, an open top oven having front and back walls, a motor, means mounting said motor on said front wall, a horizontal tray mounted on said motor to project part way over the top of the oven and being rotatable by said motor, an upright rod mounted on the backwall of the oven, and a heat reflecting bonnet above said oven and tray having heating means therein and mounted on said rod in downwardly and forwardly inclined position to deflect heat downwardly onto said tray and into the top of said oven simultaneously.

References Cited in the file of this patent

UNITED STATES PATENTS

| | | |
|---|---|---|
| 732,470 | Tatham | June 3, 1903 |
| 1,185,591 | Lueck | May 30, 1916 |
| 2,015,628 | Kanai | Sept. 24, 1935 |
| 2,263,866 | Barber | Nov. 25, 1941 |